United States Patent [19]

Zivkovic et al.

[11] Patent Number: 5,700,309

[45] Date of Patent: Dec. 23, 1997

[54] METHOD AND POWDER MIXTURE FOR REPAIRING OXIDE BASED REFRACTORY BODIES

[75] Inventors: Alexandre Zivkovic, Brussels; Jean-Pierre Meynckens, Villers-Perwin; Bernard Somerhausen, Nivelles, all of Belgium

[73] Assignee: Glaverbel, Brussels, Belgium

[21] Appl. No.: 772,868

[22] Filed: Dec. 26, 1996

Related U.S. Application Data

[63] Continuation of Ser. No. 357,549, Dec. 15, 1994, abandoned, which is a continuation-in-part of Ser. No. 350,974, Nov. 29, 1994, abandoned.

[30] Foreign Application Priority Data

Dec. 1, 1993 [GB] United Kingdom ............ 93-24-655.1

[51] Int. Cl.$^6$ ..................................... B22F 1/00
[52] U.S. Cl. ..................... 75/252; 501/94; 501/108; 501/133; 419/9; 264/30; 264/36; 427/450; 427/452; 427/453
[58] Field of Search .................. 501/94, 108, 118, 501/133; 427/450, 452, 453, 456; 75/252, 255; 419/8–10, 19; 264/30, 36

[56] References Cited

U.S. PATENT DOCUMENTS

| | | | |
|---|---|---|---|
| 4,818,574 | 4/1989 | Mottet et al. | 427/442 |
| 4,988,647 | 1/1991 | Mottet et al. | 501/99 |
| 5,061,526 | 10/1991 | Robyn et al. | 427/422 |
| 5,229,337 | 7/1993 | Robyn et al. | 501/80 |
| 5,242,639 | 9/1993 | Mottet et al. | 264/80 |
| 5,401,698 | 3/1995 | Mottet et al. | 501/105 |

FOREIGN PATENT DOCUMENTS

| | | |
|---|---|---|
| 0425668 | 5/1991 | European Pat. Off. . |
| 0426848 | 5/1991 | European Pat. Off. . |
| 0495327A1 | 7/1992 | European Pat. Off. . |
| 60-24072 | 6/1985 | Japan . |
| 1330894 | 9/1973 | United Kingdom . |
| 1374458 | 11/1974 | United Kingdom . |
| 2035524 | 6/1980 | United Kingdom . |
| 2154228 | 9/1985 | United Kingdom . |
| 2170191 | 7/1986 | United Kingdom . |
| 2190671 | 11/1987 | United Kingdom . |
| 2233323 | 1/1991 | United Kingdom . |
| 2257136 | 1/1993 | United Kingdom . |
| 90/03848 | 4/1990 | WIPO . |
| 90/13526 | 11/1990 | WIPO . |

*Primary Examiner*—Ngoclan Mai
*Attorney, Agent, or Firm*—Spencer & Frank

[57] ABSTRACT

A method of repairing an oxide-based refractory body by projecting a powder mixture against a hot surface of the body and in the presence of oxygen to provide a refractory repair mass includes providing a powder mixture composed of particles of at least one refractory oxide; fuel particles which react in an exothermic manner with the oxygen to form a refractory oxide and which are particles composed of at least one element selected from the group consisting of magnesium, aluminum, silicon, and mixtures thereof; and particles of silicon carbide present in an amount which is effective to provide a reduced porosity of the refractory repair mass and which does not exceed 10% by weight based on the weight of the powder mixture; and projecting the powder mixture against a hot surface of the oxide-based refractory body and in the presence of oxygen. Preferably, the powder mixture contains at least 1%, most preferably from 1 to 5%, by weight of the particles of silicon carbide. Preferably, the particles of silicon carbide have a particle size of less than 200 µm.

18 Claims, No Drawings

METHOD AND POWDER MIXTURE FOR REPAIRING OXIDE BASED REFRACTORY BODIES

CROSS-REFERENCE TO RELATED APPLICATION

This application is a Continuation of application Ser. No. 08/357,549 filed Dec. 15, 1994, abandoned which is a continuation-in-part of application Ser. No. 08/350,974 Nov. 29, 1994 abandoned and titled "A METHOD AND POWDER MIXTURE FOR REPAIRING OXIDE BASED REFRACTORY BODIES". (Attorney Docket GVB 0346), which application claims the priority of United Kingdom Application 9324655.1 filed Dec. 1, 1993, the subject matter of which is incorporated herein by reference.

BACKGROUND OF THE INVENTION

1. Field of the invention

The present invention relates to a method of repairing an oxide-based refractory body by a ceramic welding process.

Oxides of silicon, zirconium, aluminium and magnesium are used as industrial refractory oxides. In particular, oxides of aluminium and magnesium are currently used in the metallurgy industry, where they are chosen for their resistance to high temperature, to erosion and to corrosion by materials such as molten metal, slag and dross.

Magnesium oxide-based refractory materials, otherwise known as basic refractory materials, may form the lining of a ladle for the transport of molten steel. Such linings become abraded by the molten steel and the slag in use. Erosion of the lining occurs particularly at the level of the liquid. There is thus a need to repair such oxide based refractory bodies from time to time.

2. Description of the Related Art

It has been proposed to repair refractory bodies by use of a "ceramic welding" technique. In this technique, the refractory body to be repaired is maintained at an elevated temperature, and a powder mixture is projected in the presence of oxygen, said powder mixture comprising particles of a refractory material and fuel particles which react in an exothermic manner with the oxygen to form a refractory oxide. By this method a refractory mass builds up and adheres to the refractory body at the repair site. The technique of ceramic welding is illustrated in British patent nos. GB 1,330,894 (Glaverbel) and GB 2,170,191 (Glaverbel). The fuel particles are particles whose composition and granulometry are such that they react in an exothermic manner with the oxygen while forming a refractory oxide and while releasing the necessary heat for melting, at least superficially, the projected refractory particles.

However, it has been found that when a powder mixture consisting of oxide particles and fuel particles is used to repair an oxide-based refractory body, and in particular a refractory body based on high melting point oxides such as magnesium oxide and aluminium oxide, the resulting refractory mass may be porous. If there is a significant apparent porosity, the repair mass is not useful for certain applications, particularly if the repair mass is subject to erosion or to corrosion by molten materials.

SUMMARY OF THE INVENTION

It is therefore an object of the present invention to provide a method of repairing oxide-based refractory bodies which enables a refractory repair mass to be formed with acceptable porosity.

We have surprisingly discovered that, where the fuel particles are selected from particles of magnesium, aluminium, silicon and mixtures thereof, this objective may be achieved by the incorporation, in the powder mixture, of a specific quantity of silicon carbide. This is contrary to the generally accepted principle of matching the composition of the refractory repair mass with the composition of the refractory material surface being repaired. Further, silicon carbide is seen as an inert material in this ceramic welding process and is not wetted by the liquid phase which is formed during the reaction. The effect of the silicon carbide on the porosity of the mass is therefore somewhat surprising.

While not wishing to be bound by theory, we believe that the additional silicon carbide particles conduct heat into the refractory repair mass and that in time prolonged exposure to high temperatures causes a decomposition of the silicon carbide particles to generate elemental carbon, which is known to provide the refractory repair mass with good slag corrosion resistance.

Thus, according to a first aspect of the invention there is provided a method of repairing an oxide-based refractory body by projecting a powder mixture against a surface of said body at an elevated temperature and in the presence of oxygen, said powder mixture comprising refractory oxide particles and fuel particles which react in an exothermic manner with the oxygen to form a refractory oxide, characterised in that the fuel particles are selected from magnesium, aluminium, silicon and mixtures thereof and in that the powder mixture additionally contains up to 10% by weight of silicon carbide particles.

The level of silicon carbide in said powder mixture is preferably at least 1% by weight. If too much silicon carbide is included, we have found that the result may be that no repair mass at all is formed because the repair material flows away from the repair site. Without wishing to be bound by theory, one might expect that this may be due to the retention of too much heat following the repair process, leading to a low viscosity liquid phase. If too little silicon carbide is used, the benefits of the invention are no longer obtained to a significant degree.

The silicon carbide preferably has a small particle size, such as less than 200 μm. By "particle size" as used herein, we mean that the material concerned has a particle size distribution such that at least 90% by weight of particles conform to the given limits. "Average dimension", as used herein, designates a dimension such that 50% by weight of the particles have a smaller dimension than this average.

The refractory oxide particles may comprise at least one oxide of which the refractory body is formed. Thus, where the refractory oxide body is an aluminium oxide-containing body, the refractory oxide particles may comprise particles of alumina. Where the refractory oxide body is a magnesium oxide-containing body, the refractory oxide particles may comprise particles of magnesia.

Preferably, a major portion of said powder mixture is formed of refractory oxide particles selected from magnesia, alumina and mixtures thereof. These are the oxides in the presence of which the exothermic reaction is most lively, and therefore has a higher risk of resulting in a highly porous repair mass. Preferably, the oxide refractory particles have a size below 2.5 mm, with substantially no particles having a size above 4 mm.

The fuel particles are selected from particles of magnesium, aluminium, silicon and mixtures thereof. A mixture of aluminium and silicon is particularly advantageous. The fuel particles used in the mixture preferably have an average dimension of less than 50 μm.

The repair operation is generally performed when the refractory body is hot. This makes it possible to repair eroded refractory bodies while the equipment remains substantially at its working temperature.

The elevated temperature may be above 600° C. as measured at the surface of the refractory body to be repaired. At this temperature, the fuel particles will combust in the presence of oxygen to liberate a refractory oxide and to generate sufficient heat to cause the oxide particles, together with the combustion product of the fuel, to form into the refractory repair mass which constitutes the repair.

The invention also provides, according to a second aspect thereof, a powder mixture for the repair of oxide-based refractory bodies, said mixture comprising:

from 80% to 95% by weight of refractory particles comprising a refractory oxide; and
  from 5% to 20% by weight of fuel particles which react in an exothermic manner with the oxygen to form a refractory oxide, characterised in that said fuel particles are selected from magnesium, aluminium, silicon and mixtures thereof and in that said refractory particles include up to 10% by weight, based on total mixture, of silicon carbide particles.

In order to obtain a homogeneous repair mass, an amount of at least 80% by weight of refractory particles, including the oxide particles, should be present in the powder mixture.

In a preferred embodiment, the mixture comprises:

from 80% to 94% by weight of refractory oxide particles selected from particles of alumina, magnesia and mixtures thereof;
  from 1% to 5% by weight silicon carbide particles; and
  from 5% to 15% by weight of said fuel particles.

Preferably, the refractory particles in the powder mixture, including the silicon carbide particles, have a size of at least 10 μm. If particles which are too small are employed, there is a risk that they will be lost during the reaction.

A useful technique for bringing the powder mixture against a surface of the refractory body to be repaired, is to project the powder mixture together with an oxygen-containing gas. In general it is recommended to perform the projection of particles in the presence of a high concentration of oxygen, for example, by using oxygen of commercial quality as a gas carrier. In this manner a repair mass is easily formed that adheres to the surface onto which the particles are projected. Because of the very high temperatures that the ceramic welding reaction can reach, it can penetrate slag which might be present on the surface of the refractory body being treated, and it can soften or melt the surface in such a way that a good bond is produced between the treated surface and the newly formed refractory repair mass.

This process is conveniently carried out with the use of a lance. A suitable lance for use in the process of the invention comprises one or more outlets for the discharge of the powder stream, optionally together with one or more outlets for supplementary gas. For repairs carded out in a hot environment, the gas streams may be discharged from a lance which is cooled by fluid circulating through it. Such cooling may easily be achieved by providing the lance with a water jacket. Such lances are suitable for projecting powder at rates of 30 to 500 kg/h.

In order to facilitate the formation of a regular jet of powder, the refractory particles preferably comprise substantially no particles with a size greater than 4 mm, most preferably not greater than 2.5 mm.

The invention is particularly useful for the repair or maintenance of molten-steel ladles because it can be carded out rapidly, at a high temperature, between ladle charges, while the refractory bodies which form part of such ladles are particularly affected by contact with molten metal and slag. The region which requires the greatest repair tends to be the line of the liquid surface.

DESCRIPTION OF THE PREFERRED EMBODIMENTS

The invention will now be further described in the following non-limiting examples.

EXAMPLE 1

A refractory repair mass is formed on a wall of the magnesium oxide-based lining of a molten steel ladle. A mixture of refractory particles and particles of a fuel is projected onto these bricks. The temperature of the wall is about 850° C. The mixture is projected at the rate of 150 kg/h into a stream of pure oxygen. The mixture has the following composition:

| MgO | 87% by weight |
| --- | --- |
| SiC | 5% |
| Si | 4% |
| Al | 4% |

The MgO particles have a maximum dimension of approximately 2 mm. The silicon carbide particles have a particle size of 125 μm, with an average dimension of 57 μm. The silicon particles and the aluminium particles have a maximum dimension below 45 μm.

EXAMPLE 1A (Comparative)

By way of comparison, the same repair was carded out in the same manner as described in Example 1, but using a powder mixture of the following composition:

| MgO | 92% by weight |
| --- | --- |
| Si | 4% |
| Al | 4% |

The apparent density and apparent porosity (i.e. open porosity) of the refractory repair masses formed in Examples 1 and 1A were measured and the results were as follows:

| Example No | Density kg/dm$^3$ | Porosity (%) |
| --- | --- | --- |
| 1 | 2.9 | about 8% |
| 1A | 2–2.4 | about 20% |

In a modification of Example 1, the rate of projection was 500 kg/h. The apparent porosity was about 6% and the apparent density was 3,0 kg/dm$^3$.

In another modification of Example 1, an aluminium oxide-containing refractory may be repaired in a similar way, but where the magnesia particles in the powder mixture are replaced by the same amount of alumina particles of the same granulometry.

EXAMPLES 2 to 4

Refractory repair masses are foraged on a wall of the magnesium oxide-based lining of a molten steel ladle.

Mixtures of refractory particles and particles of a fuel are projected onto these bricks. The temperature of the wall is about 850° C. The mixtures are projected at the rate of 60 kg/h into a stream of pure oxygen. The mixtures had the following compositions (by weight):

| Example No: | 2 | 3 | 4 |
|---|---|---|---|
| Si | 4% | 4% | 4% |
| Al | 4% | 4% | 4% |
| SiC | 2% | 5% | 10% |
| MgO | 90% | 87% | 82% |

The MgO particles have a maximum dimension of approximately 2 mm. The silicon carbide particles have a particle size of 125 µm, with an average dimension of 57 µm. The silicon particles and the aluminium particles have a maximum dimension below 45 µm.

The apparent density and apparent porosity (i.e. open porosity) of the refractory repair masses formed in Examples 2 to 4 were measured and the results were as follows:

| Example No | Density kg/dm³ | Porosity (%) |
|---|---|---|
| 2 | 2.6 | 14% |
| 3 | 2.7 | 10% |
| 4 | 2.9 | 8% |

EXAMPLE 5

A ceramic welding powder comprises the following composition (% by weight):

| Alumina | 87% |
|---|---|
| Silicon carbide | 5% |
| Aluminium | 6% |
| Magnesium | 2% |

The alumina used was an electrocast alumina. The alumina had a nominal maximum grain size of 700 µm, the silicon carbide had the same granulometry as given in Example 1 above, the aluminium particles had a maximum dimension below 45 µm and the magnesium particles had a maximum dimension of 75 µm.

The above powder mixture may be used as described in Example 1, to repair a Corhart (Trade Mark) Zac refractory block (composition: alumina/zircon/zirconia) in a glass melting tank furnace beneath the working surface level of the melt after the tank has been partially drained to give access to the repair site.

What is claimed is:

1. A method of repairing an oxide-based refractory body by projecting a powder mixture against a hot surface of the body and in the presence of oxygen to provide a refractory repair mass, the method comprising:
   a. providing a powder mixture comprised of:
      from 80% to 95% by weight of refractory particles comprised of at least one refractory oxide; and
      from 5% to 20% by weight of fuel particles which react in an exothermic manner with oxygen to form a refractory oxide and which are particles selected from the group consisting of magnesium, aluminum, silicon, and mixtures thereof,
      wherein the refractory particles further comprise particles of silicon carbide in an amount which is effective to provide a reduced porosity of a refractory repair mass produced from the powder mixture and which ranges from at least 1% by weight but does not exceed 10% by weight based on the total weight of the powder mixture; and
   b. projecting the powder mixture against a hot surface of the oxide-based refractory body and in the presence of oxygen.

2. The method according to claim 1, wherein the powder mixture contains from 1 to 5% by weight of the particles of silicon carbide.

3. The method according to claim 2, wherein the particles of silicon carbide have a particle size of less than 200 µm.

4. The method according to claim 1, wherein the powder mixture contains
   from 70% to 94% by weight of the particles of at least one refractory oxide which are selected from the group consisting of alumina, magnesia, and mixtures thereof,
   from 5% to 20% by weight of the fuel particles which are comprised of at least one element selected from the group consisting of magnesium, aluminum, silicon, and mixtures thereof, and
   from 1% to 10% by weight of the particles of silicon carbide.

5. The method according to claim 4, wherein the powder mixture contains from 1 to 5% by weight of the particles of silicon carbide.

6. The method according to claim 5, wherein the particles of silicon carbide have a particle size of less than 200 µm.

7. The method according to claim 1, wherein the powder mixture contains from 80% to 94% by weight of the particles of at least one refractory oxide which are selected from the group consisting of alumina, magnesia, and mixtures thereof, and from 5% to 15% by weight of the fuel particles which are comprised of at least one element selected from the group consisting of magnesium, aluminum, silicon, and mixtures thereof.

8. The method according to claim 7, wherein the powder mixture contains from 1 to 5% by weight of the particles of silicon carbide.

9. The method according to claim 8, wherein the particles of silicon carbide have a particle size of less than 200 µm.

10. The method according to claim 1, wherein the particles of silicon carbide have a particle size of less than 200 µm.

11. The method according to claim 1, wherein the oxide-based refractory body is comprised of at least one oxide, and wherein the particles of refractory oxide comprise at least one oxide of which the refractory body is comprised.

12. A method of repairing an oxide-based refractory body by projecting a powder mixture against a hot surface of the body and in the presence of oxygen to provide a refractory repair mass, the method comprising:
   a. providing a powder mixture comprised of:
      from 80% to 95% by weight of refractory particles comprised of at least one refractory oxide; and
      from 5% to 20% by weight of fuel particles which react in an exothermic manner with oxygen to form a refractory oxide and which are particles selected from the group consisting of magnesium, aluminum, silicon, and mixtures thereof,
      wherein the refractory particles further comprise particles of silicon carbide in an amount which is effective to provide a reduced porosity of a refractory repair mass produced from the powder mixture and which ranges from at least 1% by weight but does not exceed 10% by weight based on the total weight of the powder mixture; and b. projecting the powder mixture against a hot surface of the oxide-based refractory body and in the presence of oxygen, wherein the oxide-based refractory body is selected from the group consisting of magnesium oxide-containing bodies.

13. The method according to claim 1, wherein a major portion of the powder mixture is comprised of the particles of at least one refractory oxide which are selected from the group consisting of magnesia, alumina, and mixtures thereof.

14. The method according to claim 1, wherein the oxide-based refractory body to be repaired is part of a ladle for handling molten-steel.

15. A powder mixture for the repair of oxide-based refractory bodies, comprising:

from 80% to 95% by weight of refractory particles comprised of at least one refractory oxide; and from 5% to 20% by weight of fuel particles which react in an exothermic manner with oxygen to form a refractory oxide and which are particles selected from the group consisting of magnesium, aluminum, silicon, and mixtures thereof, wherein the refractory particles further comprise particles of silicon carbide in an amount which is effective to provide a reduced porosity of a refractory repair mass produced from the powder mixture and which ranges from at least 1% by weight but does not exceed 10% by weight based on the total weight of the powder mixture.

16. The powder mixture according to claim 15, wherein the particles of silicon carbide have a particle size of less than 200 μm.

17. A powder mixture for the repair of oxide-based refractory bodies, comprising:

from 80% to 94% by weight of particles of at least one refractory oxide which are selected from the group consisting of alumina, magnesia, and mixtures thereof;

from 5% to 15% by weight of fuel particles which react in an exothermic manner with oxygen to form a refractory oxide and which are particles comprised of at least one element selected from the group consisting of magnesium, aluminum, silicon, and mixtures thereof; and from 1% to 5% by weight of particles of silicon carbide.

18. The powder mixture according to claim 11, wherein the particles of silicon carbide have a particle size of less than 200 μm.

* * * * *